March 24, 1931. J. LEDWINKA 1,797,918
PRESSED METAL AUTOMOBILE BODY
Filed June 29, 1926   3 Sheets-Sheet 2

INVENTOR.
JOSEPH LEDWINKA
BY
ATTORNEY.

Patented Mar. 24, 1931

1,797,918

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

PRESSED-METAL AUTOMOBILE BODY

Application filed June 29, 1926. Serial No. 119,281.

This invention relates to automobile bodies of pressed metal and relates especially to such bodies of the closed type.

Among the serious problems which occupy the attention of manufacturers of automobile bodies is the reduction of the weight of the body with the resultant decrease in the cost of manufacture thereof, this without sacrificing any strength in the body. Long experience by the applicant has proved that an automobile body which is constructed entirely of metal is not only considerably lighter in weight than the usual composite or wooden type of body but is also stronger, which factors have been important ones in gaining the esteem of the general riding public. A still further factor which has been influential in establishing in popular favor the all-metal automobile body has been the fact that where metal is used in the construction of the posts and those other parts of the body which normally obsruct and reduce that degree of full vision which should be had by the occupants of the car it is possible to substantially reduce the cross section of these parts to a veritable minimum, thus eliminating almost entirely those "blind spots" which for so long proved an objectionable feature in all closed types of cars.

Not only does this invention deal with the decrease in weight without corresponding decrease in strength and the elimination of bulky posts which obstruct free vision, but it also is concerned with the economies of manufacturing, which economies are effected by the use of a minimum number of parts adapted to be readily and easily assembled to form the completed body. In order that this last object may be the more readily attained, resort has been had to a particular kind of unit construction wherein the several units which go to make up the completed body are each as simple in nature as it is possible to make them, these units being provided with complete mental joint formations which are adapted for ready and convenient joinder in the final assembly operation.

Still another factor effecting economies of manufacture and operation is the facility with which the several parts of the units and of the body as a whole may be joined together. In the case of an all metal body the preferable manner of joining the component parts of the body together is by welding wherever such a method of joinder is possible and it is one of the objects of this invention to so design these component parts that a maximum of welding may be performed with minimum effort and expense.

To secure the aforementioned objects is the general object of this invention.

Another object of the invention is the provision of an exceedingly simple cowl subassembly unit containing a minimum number of parts and adapted for ready final assembly with the other component units of the complete body. Not only is it an object of this invention to obtain a simple cowl unit but it also is an object to provide a simplified and at the same time a strong construction in the remaining units, which units are the side and tonneau units.

Still another object is the provision of a unitary gasoline tank assembly which is adapted to be fitted partly within the cowl unit and which includes elements which complement and serve to interbrace those elements which form part of the cowl unit.

Still other objects of the invention are the provision of simple and yet exceedingly strong final assembly joints at all points of final assembly between the component body unit assemblies and to insure the rigid and secure joinder of the several elements in each unit.

A still further object is the provision of a minimum number of framework elements, thus utilizing to the greatest possible extent the inherent strength of the body paneling itself.

Further objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

In the accompanying drawings Figure 1 is a vertical longitudinal section through the cowl unit of the body showing the extreme forward portions of the side top rails and body sills.

Figure 3 is a view in vertical longitudinal section of the tonneau unit.

Figures 4 to 12, inclusive, are sections taken on the corresponding lines of Fig. 1.

Figure 13 is an enlarged view showing the joinder between the top of the front door post and the forward end of the side top rail, the windshield moulding shown in Fig. 1 being removed.

Figure 14 is a plan view of the top of the cowl panel, and Figure 15 is a section taken on the line 15—15 of Fig. 14.

In the drawings similar reference numerals refer to similar parts throughout the several views and the section views are taken looking in the direction of the arrows at the ends of the section lines.

Figure 7:
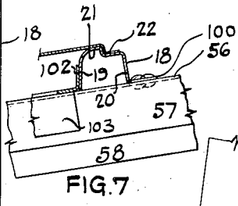
Figures 9, 11:
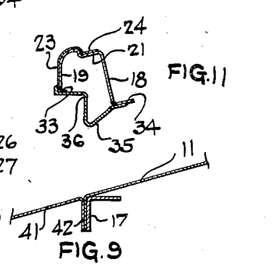
Figures 10, 13, 14, 15:
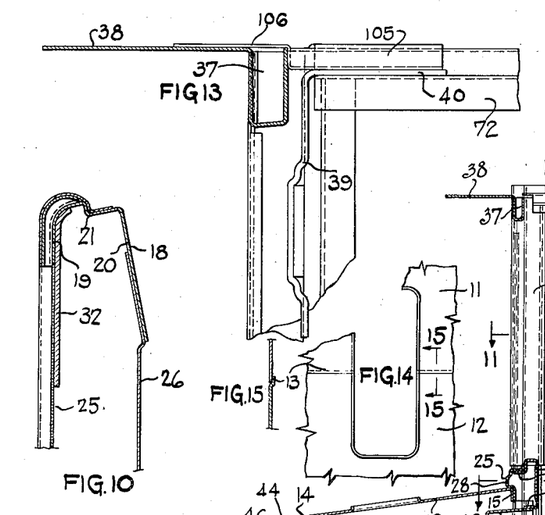
Figure 12:
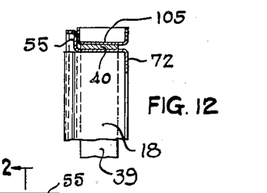
Figure 24:
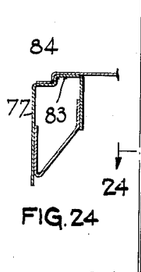
Figures 24 to 34 are sections taken on the corresponding lines of Fig. 3.
Figure 25:
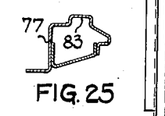

In the accompanying drawings the applicant has illustrated an automobile body structure in accordance with and forming one embodiment of this invention. Essentially, this body comprises a cowl unit shown generally in Fig. 1, an intermediate unit shown generally in Fig. 2 and a tonneau unit shown generally in Fig. 3, which units are adapted to be finally assembled to form the completed body. The cowl unit per se comprises the cowl panel 10, which in this particular instance, is formed of two sections 11 and 12, each of which sections form one side and half of the top of the cowl panel. One of the contiguous edges of the sections 11 and 12 of the cowl panel is downwardly offset as at 13 (see Fig. 15) to form a shallow rabbet in which the edge of the adjacent panel section is seated to effect a longitudinally extending joint from the front to the rear of the cowl panel. It is, of course, understood that this invention contemplates the provision of a single integral cowl panel should this be found desirable instead of the two section cowl panel shown in Figs. 14 and 15. The cowl panel 10 is provided at its forward edge with a continuous inturned flange 14 and at its rear top edge with a downturned flange 15, while the side bottom edges thereof are provided with inturned flanges 16. Nested in the angle formed in the front of the cowl by the flange 14 and the main body of the cowl panel is a reinforcing member 17, preferably of angle shape and extending from side to side of the cowl panel. Secured to the rear vertical edges of the cowl panel in a manner to be hereinafter described are the front door posts indicated generally by the reference numeral 18. These posts are each of substantially channel formation presenting inwardly of the body and formed with the side walls 19, 20 and the base wall 21. These posts extend substantially from the floor of the body to the roof thereof without any substantial change in cross section. The base wall 21 of the post is provided with an inwardly pressed rabbet or shoulder extending longitudinally of the post and forming a vertically extending angle section for the reception of the rear vertical edges of the cowl panel which are complementally formed to be neatly nested therein as shown by reference numeral 22 in Fig. 7. The upper section of the post as shown in Figs. 10 and 11 is likewise provided with this rabbeted formation in continuation of the rabbet in the lower section of the post, the upper section being provided with a paneling 23 covering the forward wall 19 and the base wall 21 of the post. This paneling 23 is also formed along its rearwardly extending edge of angular formation adapted to be nested in the rabbet of the post as indicated by 24, thus providing a continuous vertically extending rabbet 22—24 from the bottom of the post to the top thereof for reception of the forward overlap of the front door, (not shown), the wall 18 constituting the jamb wall of the post.

Transversely extending between the front door posts at the rear upper edge of the cowl panel 10 are a pair of stampings 25 and 26 joined together as at 27 to constitute a substantially downwardly presenting channelled construction forming the lower windshield frame element. The stamping 25 is inwardly offset along its lower edge to overlie the downwardly extending flange 15 of the cowl panel, this stamping being also provided with a forwardly expressed transversely extending bead 28 providing a neat finish at the upper rear edge of the cowl panel. Stamping 26 is formed along its bottom edge with a forwardly extending flange 29 to which is secured, preferably by welding, the instrument board support 30, which latter, in turn, supports the instrument board 31. As is clearly shown in Fig. 10 the side edges of the stampings 25 and 26 lie substantially in the planes respectively of the walls 19 and 20 of the front door posts, the stamping 25 being secured to the wall 19 of the post by a gusset plate or similar element 32, while the stamping 26 lies against and is welded to the inner face of the wall 20 of the post. There is thus provided a strong cross base construction between the oppositely disposed front door posts, which not only serves to tie these posts together but which also constitutes an effective and at the same time neat appearing brace and finish at the rear top edge of the cowl panel 10. As is most clearly shown in Fig. 11 the walls 19 and 20 of the door post are provided with rearwardly extending flanges 33 and 34, respectively, extending from the belt line of the body upwardly, which flanges are utilized in the securement of the side windshield frame element 35. These windshield frame elements 35 are formed with forwardly and inwardly presenting angles 36 cooperating with the transversely extending forwardly and upwardly presenting angle at the joint 27 for the reception of the side and bottom edges of the windshield, (not shown).

The upper ends of the front door posts are interconnected by a transversely extending substantially upwardly presenting channel member 37 which member is provided with a forwardly extending flange 38 constituting the front visor of the automobile body. A hinge bracket 39 of substantially angle shape is secured by one branch thereof to the inner face of the wall 18 of the door post, the other branch 40 thereof extending over the top of the wall 18 rearwardly of the body to provide a connecting medium for the front end of the side top rail of the body. It will be seen from the foregoing description that the cowl unit including as it does the cowl panel and the front door posts is an exceedingly simple construction and with all, one of which there has been no sacrifice of strength, mainly by reason of the various sections of stampings employed and the manner by which they have been joined together.

Figure 8:
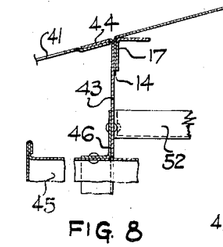

One of the features of this particular body is the novel fuel tank assembly which assembly is comprised of several elements which normally form part of the usual cowl construction but which, in this case, are assembled as part of this fuel tank assembly. This assembly includes primarily a pair of side stampings 41 constituting the side standards of the unit. These stampings are of substantially triangular shape, the rear vertical edges of which are provided with inturned flanges 42 adapted to be secured, preferably by welding, to the inturned side flanges 14 at the forward edges of the cowl panel 10. (See Fig. 9.) Extending transversely between the side standards 41 is a sheet metal stamping 43 formed at its top and upper sides with a continuous forwardly extending flange 44. The upper vertical edges of the side stampings 41 are formed without the inturned flanges 42 but are offset inwardly to a slight extent to lie against and be welded to the inner faces of the flanges 44 of the main stamping 43 as shown most clearly in Fig. 8. The main stamping 43 is provided in its upper section with an opening through which the gasoline or fuel tank 45 extends, an angle member or similar stamping 46 being employed for the purpose of securing this tank to the stamping 43. The lower portion of the stamping 43 is bent forwardly as at 47 and then downwardly and rearwardly as at 48 and terminates in a substantially horizontally and rearwardly extending flange 49, the rear edge of which is downwardly offset as at 50 for the reception of the forward edges of a floor board, (not shown). The side edges of the downwardly and rearwardly inclined portion of the stamping 43 are rigidly secured to the side stampings 41 by a pair of bracket members 51.

Secured to the rear face of the main stamping 43 on opposite sides of the fuel tank 45 and extending rearwardly and upwardly are a pair of brackets 52, the rear ends of which are adapted to be secured, preferably by welding, to sides of the instrument board 31, these brackets 52 normally forming elements of the fuel tank assembly. It should be evident that when this fuel tank unitary assembly is assembled with the cowl unit heretofore described, the elements of the former will cooperate with the elements in the latter to form a very rigid and substantial, and yet simple, front unit for the body. It is, of course, to be understood that it is within the contemplation of this invention to form the brackets 52 as part of the cowl unit assembly proper rather than as part of the fuel tank assembly should the former expedient be considered advisable.

From a standpoint of convenience and economy in assembly it has been found desirable to provide side frame sub-assembly units each comprising a longitudinally extending main body side sill designated generally by the reference numeral 53, an intermediately positioned vertically extending door post 54 and a top side rail 55. These elements are joined and secured together to form substantially an I and are each adapted for ready assembly with the cowl unit already described and the tonneau unit to be described hereinafter. The main body side sill 53 extends longitudinally of the body substantially from the forward edge of the cowl unit to a point just in advance of the transverse plane of the rear edge of the rear door opening and is of substantially channel cross section throughout. As is most clearly shown in Figs. 4, 5, 6 and 16 the channel of the body sill 53 presents inwardly of the body such that its base wall 56 forms the outer wall of the sill and its side walls 57—58 form, respectively, the top and bottom of the sill. Beginning from a point approximately in line with the depressed rear edge 50 of the fuel tank assembly main panel 43 when the latter is assembled in position in the cowl unit and extending rearwardly to a point just beneath the front edge of the front seat the sill 53 is provided with a longitudinally extending Z shaped element 59 having one branch thereof secured to the under surface of the top wall 57 of the sill, while the other branch thereof is inwardly and downwardly offset with respect to the sill to constitute a support for the floor boards. A similar floor board element is secured to the sill 53 in a similar manner along that portion of the latter which forms the rear door threshold.

The door post 54 has its bottom end secured to the body sill 53 at a point intermediate the ends thereof, this post being of substantially channel formation presenting inwardly of the body. The base wall 60 of this channelled door post extends substantially unaltered throughout the entire extent of the post while the side walls 61 and 62 thereof are variously formed at different elevations thereof for the accommodation of the necessary door hardware. Along the upper portion of the post, the side walls 61 and 62 are provided with outwardly turned flanges 63 and 64, respectively, these flanges 63 and 64 being provided in the lower portion of the door post with inturned portions 65 and 66, respectively, the free edges of which are adapted to abut against the outer wall 56 of the body sill. The sections of the portions 65—66 of the door post which abut against the body sill are provided with outturned flanges 67 and 68, respectively, which are rigidly secured, by welding or otherwise, to the outer wall of the sill, while the base wall 60 of the post is extended downwardly of the side walls thereof and then bent inwardly as at 69, (see Fig. 17), to form a bottom closure for the door post lying in the plane of the bottom wall of the body side sill.

Extending transversely between the walls 65 and 66 at the bottom of the post is a channel shaped member 70 the side walls of which are secured to the inner surfaces of the side walls of the post. The base wall of this channel shaped member 70 extends beyond the bottom edges of the side walls thereof and is curved inwardly as at 71 to overlie and be secured to the top wall 57 of the body sill. It will thus be seen that there has been provided a very substantial and yet simple means for joining the bottom of the intermediate door post to the side sill.

Figures 2, 16, 17, 18, 19, 20, 21, 22, 23:
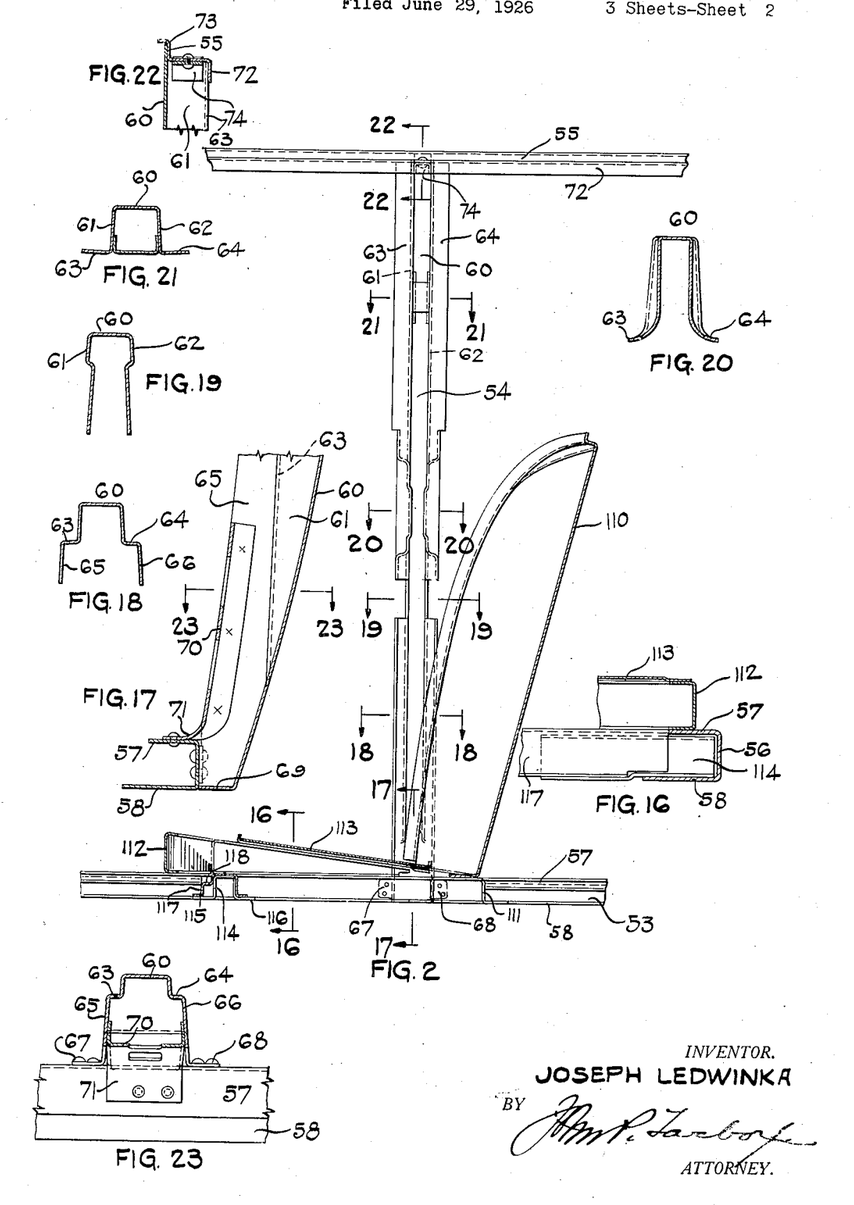
Figure 2 is a view in vertical longitudinal section through the center of the front seat assembly showing the relation of the main body side sill, the intermediate door posts and the side top rail.
Figures 16 to 22, inclusive, are sections taken on corresponding lines of Fig. 2.
Figure 23 is a section taken on line 23—23 of Fig. 17.
Figure 5:
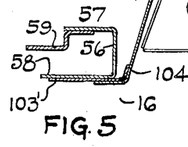
Figure 6:
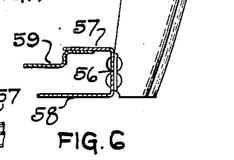

The top rail 55 of the side frame unit is, as shown in Fig. 22, of substantial double angle cross section. the depending branch 72 of which constitutes the inner side of the rail while the upwardly extending branch 73 constitutes the outer portion of the rail. The top of the door post 54 is effectively secured to this top rail by extending the base 60 upwardly beyond the side walls 61—62 thereof, such that it overlies and is secured to the upwardly extending branch 73 of the top rail while the upper portions of the outwardly extending flanges 63—64 of the door post lie closely against and are secured to the inner surface of the depending branch 72 of the top rail. A U shaped strap 74 has its main body secured to the horizontally extending branch of the top rail while the legs thereof are secured to the opposite walls 61—62 of the door post 61 to effect an even more rigid joinder of door post and top rail.

The rearmost unit, called the tonneau unit, includes as component elements thereof, the tonneau side sills 75, the tonneau rear sill 76, the rear door post 77, the tonneau side top rail 78, and the rear quarter post 79, all of which are joined and interconnected by the tonneau paneling designated generally by reference numeral 80. The tonneau side sills 75 are generally of angle cross section and are joined at their rear ends in the usual manner by the transversely extending channel shaped rear sill 76. The fore ends of the tonneau side sills terminate substantially in the plane of the rearmost door post, usually called the "D" post, and is embraced by a D post bracket 81, the lower longitudinally extending portion of which is formed of angle section within which the forward portion of the tonneau side sill is nested and secured. This D post bracket is provided in its lower outer surface with an inset portion 82 constituting the forward section of the wheel housing. Supported upon and carried by the upper portion of the D post bracket 81 is the rear door post 77 which post is substantially of inwardly presenting channel formation, the base wall 83 of which is provided in its lower portion with a longitudinally extending rabbet 84 in which is adapted to be nested and secured the front vertical edges of the side portions of the tonneau paneling 80. This rabbet 84 is continued upwardly throughout the entire extent of the D post to constitute a seat or shoulder for the rear overlap of the rear door, the base wall 83 of the upper portion of the post being uncovered and constituting in itself the outer paneling of the body. The rear wall of the post 77 is provided along its upper vertical edge portion with a rabbet or shoulder constituting a portion of the rear quarter window glass frame.

Figure 26:
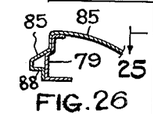
Figure 27:
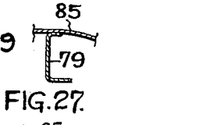
Figure 31:
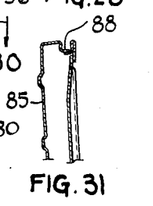
Figures 35, 37:
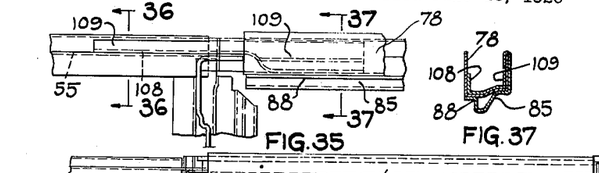
Figure 35 is an enlarged view showing the joinder between the main body and the tonneau top rails of the top of the rearmost door post.
Figures 36 and 37 are sections taken on the lines 36—36 and 37—37, respectively, of Fig. 35.
Figure 36:
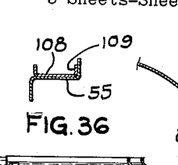

The paneling of the tonneau section, heretofore designated generally by the reference numeral 80, comprises the side panel stampings 85 joined together at their rear vertical edges by the transversely extending panel stamping 86. The side panel stampings 85 extend substantially from top to bottom of the tonneau unit and from the D post rearwardly to a point approximately in line with the rear transverse plane of the body. The lower portion of the side panels 85 are inset inwardly to provide integral wheel housing sections 87 in continuation of the inset portions 82 of the post D bracket. The upper portions of these side panel stampings 85 are provided with openings constituting the rear quarter window openings of the tonneau unit, the perimetral edges of which opening are integral with the side panel stamping 85 as is most clearly shown in Figs. 37, 26 and 31. The inner perimetral edges of the stamping defining the rear quarter window opening are rabbeted or shouldered as designated by reference numeral 88 to form together with the similar rabbet or shoulder in the D post a frame for the rear quarter window glass. The extreme upper edge of the side panel 85 is clinched over and secured to the outer wall of the tonneau top rail 78, (see Fig. 37).

Figure 29:
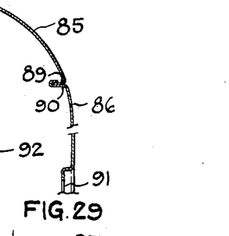
Figures 30, 32:
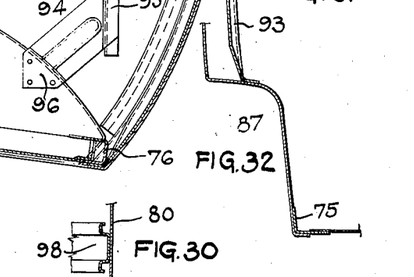

The rear vertical edges of the side panel stampings 85 are provided with inturned forwardly presenting flanges 89 which flanges are adapted to lie against and be secured to similarly formed flanges 90 along the side vertical edges of the transversely extending rear panel stamping 86, the flanges 90 being of a depth somewhat greater than the flanges 89 whereby they may be clinched over the latter in the manner shown in Fig. 29. This provides a neat appearing and tight joint extending vertically along the opposite sides of the body at the rear thereof. The rear panel stamping 86 is provided in its upper portion with an opening 91 for the reception of the rear window glass, the boundary of this window opening being defined by a forwardly offset flanged edge 92.

Figure 28:
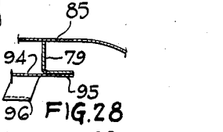

Vertically extending along the inner surface of the side panel stamping 85 is a brace member 93 having its opposite ends flanged for securement, respectively, to the inwardly extending flange defining the bottom edge of the rear quarter window opening and to the top of the wheel housing portion 87 of the tonneau, while vertically extending along the inner surface of the side panel stamping at the rear vertical edge of the side quarter window is the rear quarter or "E" post designated generally heretofore by the reference numeral 79. This E post is in its upper portion of substantially channel formation presenting rearwardly of the body, while in its lower portion is of simple angle formation as indicated in Fig. 28. The lower end of this E post terminates at a point substantially to the rear and above the wheel housing 87. In order to secure a firm foundation for the bottom of this post a bracket member 94 is provided, which member is disposed in a forwardly and downwardly inclined manner, the rear vertical edge 95 of which is secured to one branch of the angle section at the bottom of the E post while the opposite edge 96 thereof is formed to overlie and be secured to the top and inner wall of the wheel housing 87. Extending from the E post on one side of the tonneau unit to the E post on the other and underlying the flange which defines the bottom edge of the rear window opening 91 is a curved angle bar 97 having an inner depending flange providing a means for retaining the interior upholstery in position. Centrally disposed with respect to the rear transverse panel of the tonneau unit and extending vertically between the transversely extending rear sill 76 and the angle bar 97 is the rear vertical brace member 98, the upper and lower ends of which are flanged to underlie and be secured respectively to the horizontal branch of the angle bar 97 and the bottom wall of the rear sill 76.

The final assembly of the several units, namely, the cowl, the side frame and the tonneau units, may be readily effected. The side frame units are joined to the cowl such that the fore ends of the body sills lie within the cowl with the free edges of the walls of the front door posts abutting the outer wall 56 thereof. One of the walls of the door post, namely, the rear wall 18 is provided with a rearwardly extending tab or flange 100 which lies against and is secured to the outer wall 56 of the sill. A bracket 101 of substantially triangular shape is disposed within the angle formed by the front door post and the forwardly extending portion of the body sill and is provided along its vertical edge with an outwardly extending flange 102 for securement to the front wall 19 of the front door post and along its bottom edge with an inwardly extending flange 103 adapted to overlie and be secured to the upper wall 57 of the body sill. In order to compensate for the particular contour which is given to the bottom side edge of the cowl panel a member 103' is used which is of substantial angle shaped cross section, one branch of which underlies and is secured to the lower wall 58 of the sill, while the other branch 104 is outwardly offset from the outer wall 56 of the body sill to lie against the inner surface of the side cowl panel along the bottom edge thereof. Such a provision obviates all necessity for providing a certain longitudinal contour to the fore end of the body side sill to compensate for variations in the curvature along the bottom edges of the cowl panel.

The final assembly unit joint at the top of the front door post is effected by means of a substantial channel shaped member 105, the base of which rests upon and is secured to the rearwardly extending branch 40 of the hinge bracket 39, which branch in turn is secured to the horizontally disposed web portion of the top rail 55, the base wall of the channel 105 being extended upwardly and forwardly as indicated at 106 to overlie the open end of the peak panel 37.

The final assembly unit joint between the rear ends of the side frame units and the forward ends of the tonneau unit is effected both at the top and at the bottom of the D post by longitudinally extending members interconnecting the adjacent portions of these units. In the case of the joint at the bottom of the D post the rear end of the main body side sill terminates short of the fore end of the tonneau side sill, the adjacent portions of which are adapted to be nested in and secured to the flanged bottom portion of the D post bracket.

Figure 33:
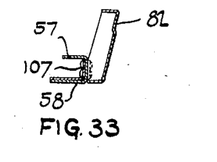
Figure 34:
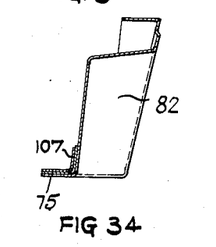

Nested within the angle formed by the lower wall 58 and the base wall 56 of the main body side sill is the longitudinally extending angle member 107 which angle member is provided with a rearwardly extending portion adapted to be nested in and secured to the forward portion of the angle shaped tonneau side sill 75. It will thus be seen that there has been provided a final assembly unit joint at the base of the D post wherein the adjacent portions of the body side sill and the tonneau side sill are embraced exteriorly by the substantially angle shaped D post bracket and interiorly by the longitudinally extending angle shaped member 107, this structure being most clearly shown in Figs. 33 and 34.

In the case of the final assembly unit joint at the top of the D post a channel member 108 is employed, the base which is founded on and secured to the horizontally disposed portions of the main body side and tonneau top rails. As appears most clearly in Fig. 35 it will be seen that the tonneau top rail, which is of upwardly presenting channel cross section, has its base portion disposed in a horizontal plane lying below that in which lies the horizontal portion of the main body side top rail 55. Consequently, in order to provide an effective joint between the adjacent edges of the main body and tonneau top rails, the channel member 108 has its forward portion upwardly offset with respect to its rear portion, the outer wall 109 of the channel 108 being secured, respectively, preferably by welding, to the outer branches of the adjacent side top rails.

Interconnecting the side frame units is the front seat unit including the seat back panel 110, which panel extends from the upper garnish rail edge thereof downwardly to a point substantially in the plane of the upper edge of the body side sills. A cross member 111 of substantially inverted channel cross section extends between the body side sills 53, the top wall of which cross member constitutes the lower transverse support for the bottom edge of the seat back panel 110. Extending from side post to side post of the body in substantially U form is the front seat cushion support member 112, the transversely extending portion of which constitutes the heel board of the unit and the side walls of which taper rearwardly to give the proper inclination to the front seat cushion. This U shaped stamping 112 is generally of inwardly presenting channel cross section the bottom wall of which rests upon and is secured to the top wall 57 of the main body side sill while the top wall thereof constitutes a support for the seat bottom pan 113. At a point just to the rear of the transversely extending portion of the cushion support stamping 112 and extending outwardly of the open ends of the body side sill 53 are a pair of transversely aligned inverted channel members 114. These channel members are provided with outturned flanges 115 and 116, portions thereof which rest upon and are secured to the lower wall 58 of the body side sill. These members 114 constitute oppositely disposed brackets for the support of a main transversely extending cross member 117 which latter is also of inverted channel cross section adapted to overlie and closely embrace the projecting portions of the members 114. The opposite ends of the main cross member 117 do not extend within the channels of the body side sills but instead are secured, preferably by welding, directly to the supporting brackets 114. The front wall of the cross member 117 is provided with a transversely extending rabbet or shoulder 118 to form the rear support for the floor boards of the body.

In the annexed claims applicant desires to claim all modifications of this invention which fall within the purview of its generic spirit.

What I claim as new and useful is:

1. In a pressed metal automobile body, a main body side sill of a section provided with an inwardly extending bottom flange, a cowl panel provided at its bottom edge with an inwardly extending flange underlying said flange of the side sill, and a member of substantial angle section, one branch of which is disposed intermediately of said flanges on said side sill and cowl panel and the other branch of which lies against the main body of the cowl panel thereby to space the latter from the side sill.

2. In a pressed metal automobile body, a unitary cowl sub-assembly including a pair of vertically extending front door posts the upper ends of which are joined together by a channel shaped member having its forward side wall provided with a forwardly extended flange and constituting the peak panel of the unit in combination with a unitary side assembly including a main body side sill, an intermediate door post and a top rail all integrally joined together, the forward end of said top rail being joined to the upper end of one of said front door posts through the intermediary of a member joined to said top rail and having a portion thereof overlying the open side of said channelled peak panel and extended forwardly over said flange and secured thereto.

3. In a pressed metal automobile body construction a transversely extending peak panel of substantially channel shaped cross section, a longitudinally extending side top rail of substantially angle cross section, and a channel shaped member overlying and secured to the horizontal branch of said top rail, the top edges of said channel lying substantially in the plane of the top edges of said peak panel and the bottom wall thereof being upwardly and forwardly extended to overlie said edges of the peak panel.

4. In a pressed metal automobile body construction, a main body side top rail of a section including a main body portion horizontally disposed and an outer portion vertically disposed in combination with a tonneau section side top rail of substantially channel formation, said main body and tonneau section top rails being joined together by a member of substantially channel formation nested in the outer angles of said top rails.

5. In a pressed metal automobile body, a side top rail extending substantially the full length of the body and formed insections meeting in the vicinity of the forward edge of the tonneau section of the body, the forward section of said top rail being of a section the main body of which is horizontally disposed and lies in a plane vertically displaced with respect to the plane in which the horizontally disposed main body portion of the rear section of the top rail lies, said sections being joined by a member having its fore and rear portions vertically offset and secured, respectively, to the adjacent portions of said forward and rear sections of the top rail.

6. In a pressed metal automobile body, the combination of a main body side top rail and a tonneau side top rail, said top rails being each of a section including a longitudinally extending angle presenting inwardly and upwardly of the body, and an upwardly presenting channel member having the base and one wall thereof overlying proximate portions of said top rails and nesting in the angles thereof.

7. In a pressed metal automobile body, a unitary side frame sub-assembly including a top rail of substantially Z section extending from the front door post to the front of the tonneau section of the body in combination with a unitary tonneau sub-assembly including as one element thereof a top rail of channel cross section presenting upwardly, the base of which channel lies in a plane substantially parallel to and below that of the web of the side frame top rail, said side frame and tonneau top rails being joined together in final assembly by a member of a section having portions of the base thereof vertically offset with respect to one another for securement to the adjacent sections of said side frame and tonneau top rails.

8. In a pressed metal automobile body, a unitary side frame sub-assembly including a longitudinally extending body side sill of channel cross section presenting inwardly of the body, a door post substantially of channel cross section presenting inwardly of the body, and a top rail of substantially Z cross section, the lower section of the base wall of said channel door post being extended downwardly to lie substantially in the plane of the lower wall of the side sill and the upper section thereof being extended upwardly to overlie the outer and upwardly extending branch of the top rail.

9. In a pressed metal automobile body, a unitary side frame sub-assembly including a longitudinally extending body side sill, a door post mounted thereon, said door post being of substantially inwardly presenting channel formation and the walls of the channel being provided with oppositely laterally extending flanges, and a top rail of substantially Z cross section, the web of which is disposed horizontally and the outer branch of which extends upwardly, characterized by the fact that the base wall of the channel door post overlies and the lateral flanges thereof underlie, respectively, the upwardly and the downwardly extending branches of the Z shaped top rail.

10. In a pressed metal automobile body, a pair of longitudinally extending body side sills of substantially channel cross section presenting inwardly of the body, a channel-shaped cross brace member extending between the inner edges of said side sills, and connecting members nested in the opposite ends of said cross member and secured thereto, said members having portions thereof projecting into and connected to said channel shaped side sills.

11. In a pressed metal automobile body, a longitudinally extending body side sill of substantially channel cross section presenting inwardly of the body, an inverted channel shaped bracket member, said member having one end thereof disposed within said channel side sill and the other end freely projecting therefrom, and a cross brace of inverted channel cross section adapted to overlie and be supported by and secured to said projecting end of the bracket member and terminating adjacent the inner edge of the sill.

12. In a pressed metal automobile body a unitary tonneau sub-assembly including a pair of longitudinally extending side top rails, of upwardly presenting channel formation, a pair of rear door posts having the upper ends thereof adapted to be secured to the forward ends of said top rails, and a plurality of sheet metal panel stampings, the upper portions of which are provided with rear quarter window openings, the upper edges of said panels being clinched over said top rails.

13. In a vehicle body construction, front posts, an upwardly presenting channel member having its forward side wall provided with a forwardly extending flange and constituting the peak panel joining said posts, and side top rails joined to the tops of the posts, said joint between top rail and channel member comprising a pressed metal member secured to said top rail, to the rear wall of said channel member and, by a forward extension, to the forwardly extending flange.

14. In a pressed metal vehicle body, a pair of longitudinally extending side sills of inwardly presenting channel form, opposed pressed metal brackets extending inwardly from the sills and having their outer ends telescoped into the channels of the sills and secured thereto, and a cross member overlying and secured to the inwardly extending portions of the brackets, the top of said cross member lying in the plane of the tops of the sills.

15. In an automobile body, a cowl construction including a cowl panel having a reinforced front edge, a sheet metal stamping having the sides and top of the upper portion thereof secured to said reinforced edge of the cowl panel, said stamping being offset forwardly of the front edge of the cowl panel in its lower portion and then inclined rearwardly and downwardly to constitute a toe board for the cowl section of the body adapted to merge into the horizontal flooring of the body, and brackets secured to and projecting forwardly of the side edges of the cowl panel in its lower portions, the side of said inclined toe board portion of the stamping being rigidly secured to said brackets.

16. In an automobile, a cowl panel, a substantially transversely disposed stamping adapted to be applied to the front edge of the cowl panel, and having its upper portion substantially in the plane of the front edge of the cowl and providing the shroud pan connecting the sides and top of the cowl panel, the lower portion of said stamping being extended forwardly beyond the front edge of the cowl and then inclined rearwardly and downwardly to constitute the toe board support.

In testimony whereof he hereunto affixes his signature.

JOSEPH LEDWINKA.